(12) United States Patent
Badiger et al.

(10) Patent No.: US 10,808,118 B2
(45) Date of Patent: Oct. 20, 2020

(54) EPOXY NOVOLAC COMPOSITES

(71) Applicant: COUNCIL OF SCIENTIFIC & INDUSTRIAL RESEARCH, New Delhi (IN)

(72) Inventors: Manohar Virupax Badiger, Pune (IN); Rajeshwari Shyamji Gour, Pune (IN); Prakash Purushottam Wadgaonkar, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 15/536,494

(22) PCT Filed: Dec. 16, 2015

(86) PCT No.: PCT/IN2015/050206
§ 371 (c)(1),
(2) Date: Jun. 15, 2017

(87) PCT Pub. No.: WO2016/098130
PCT Pub. Date: Jun. 23, 2016

(65) Prior Publication Data
US 2017/0355849 A1 Dec. 14, 2017

(30) Foreign Application Priority Data
Dec. 16, 2014 (IN) .......................... 3715/DEL/2014

(51) Int. Cl.
*C08L 63/04* (2006.01)
*C08G 59/38* (2006.01)

(52) U.S. Cl.
CPC .............. *C08L 63/04* (2013.01); *C08G 59/38* (2013.01)

(58) Field of Classification Search
CPC ................................ C08L 63/04; C08G 59/38
See application file for complete search history.

(56) References Cited

U.S. PATENT DOCUMENTS

| | | | |
|---|---|---|---|
| 3,316,323 A | 4/1967 | Wille et al. | |
| 4,100,118 A | 7/1978 | Numata et al. | |
| 4,525,542 A | 6/1985 | DeGooyer | |
| 4,532,308 A | 7/1985 | Sato et al. | |
| 5,389,328 A * | 2/1995 | Urban | A61F 5/01 264/294 |
| 6,489,405 B1 * | 12/2002 | Beisele | C08G 59/12 428/413 |
| 6,573,309 B1 * | 6/2003 | Reitenbach | C08G 59/186 521/135 |
| 2003/0119987 A1 * | 6/2003 | Eadara | C08G 59/50 525/107 |
| 2003/0149169 A1 * | 8/2003 | Bammel | C08J 3/07 524/611 |
| 2004/0077773 A1 * | 4/2004 | Tavares | C08G 18/69 524/507 |
| 2006/0264573 A1 * | 11/2006 | Bennett | C08F 220/18 525/107 |
| 2009/0099312 A1 * | 4/2009 | Weber | C08G 65/33306 525/181 |
| 2009/0212252 A1 * | 8/2009 | Elgimiabi | C08G 59/184 252/62 |
| 2010/0311870 A1 * | 12/2010 | Feola | C08G 59/1433 523/404 |
| 2012/0156500 A1 * | 6/2012 | Moore | C09D 163/00 428/413 |
| 2013/0056151 A1 * | 3/2013 | Walter | C08G 59/04 156/281 |
| 2013/0109784 A1 * | 5/2013 | Baro | C08G 59/1466 523/427 |
| 2014/0186536 A1 | 7/2014 | Padilla-Acevedo et al. | |

FOREIGN PATENT DOCUMENTS

| | | |
|---|---|---|
| CN | 1255449 | 6/2000 |
| DE | 1143023 | 1/1963 |
| EP | 0175589 | 3/1986 |
| EP | 0780435 | 6/1997 |
| EP | 2220162 | 8/2010 |
| GB | 1366603 | 9/1974 |
| WO | WO-2009-079428 | 6/2009 |
| WO | WO-2012-058657 | 5/2012 |

OTHER PUBLICATIONS

International Search Report for PCT/IN2015/050206 dated Apr. 20, 2016.
Written Opinion for PCT/IN2015/050206 dated Nov. 4, 2016.

* cited by examiner

*Primary Examiner* — Megan McCulley
(74) *Attorney, Agent, or Firm* — Nixon Peabody LLP; Jeffrey L. Costellia

(57) ABSTRACT

The present invention disclosed novel epoxy novolac composite comprising environmentally friendly toughening agents based on bio-derived chemicals namely, Difunctional glycidyl ether epoxy resin (Cardolite NC-514) and Polyglycidyl ether of an alkenyl phenol formaldehyde novolac resin (Cardolite NC-547) used for the toughening of epoxy novolac resin namely Poly[(phenyl glycidyl ether)-co-formaldehyde] [PPGEF].

7 Claims, 7 Drawing Sheets

EPOXY NOVOLAC COMPOSITES

The following specification particularly describes the invention and the manner in which it is to be performed.

FIELD OF THE INVENTION

The present invention relates to novel epoxy novolac composites. More particularly, the present invention relates to novel epoxy novolac composites prepared by using toughening agents based on bio-derived chemicals such as cardolites.

BACKGROUND AND PRIOR ART OF THE INVENTION

Epoxy resins belong to the class of thermosetting polymers and have a wide range of applications in polymer composites, adhesives, high performance coatings, potting, encapsulations, and numerous other areas. They have excellent mechanical and electrical properties, low cure shrinkage, very good adhesion to many substrates and good resistance to moisture. However, conventional epoxy resins prepared from bisphenol-A and epichlorohydrin exhibit inherent brittleness and low elongation upon curing.

In order to overcome the problem of brittleness and low impact resistance, large number of synthetic tougheners/flexibilizers such as carboxyl terminated butadiene-acrylonitrile (CTBN) rubber; amine terminated butadiene-acrylonitrile (ATBN) rubber; epoxy terminated butadiene-acrylonitrile (ETBN) rubber; functionalized silicones; thermoplastic polyesters etc have been traditionally used to modify epoxy and epoxy novolac resins.

Liquid rubbers when incorporated in to epoxy resins, decrease the $T_g$, tensile strength and modulus of the overall composite which is a specific drawback of such systems. Another way of toughening epoxy resins is to incorporate phenolic moieties into the epoxy resin matrix. In this context, epoxy novolac resins have become extremely important. Epoxy novolac resins are epoxidized novolac resins of higher functionality compared to the standard bisphenol-A based epoxy resins. These resins display very good properties of both thermal stability and chemical resistivity. However, they lack sufficient elongation. Therefore, the elongation property of epoxy novolac resins can be improved by incorporating some flexibilizers such as dibutyl phthalate, tricresyl phosphate, epoxy diluents, hyper branched polymers, liquid rubber etc. Polysulfides flexibilizers have also been used for toughening of novolac epoxy resins.

PCT application no. 2006045407 discloses an epoxy curable composition of aromatic halogenated glycidyl ether resins cured with amines, wherein said ambient temperature curable or polymerizable epoxy resin composition comprising an epoxy part (a) which comprises a combination of: (a,i) at least an aromatic halogenated glycidyl ether resin, (a,ii) a non halogenated glycidyl ether resin and (a,iii) optionally a reactive diluent or/and a solvent and the hardener part (b) comprising aliphatic, cyclo-aliphatic, aromatic amines and optionally diluent and/or a solvent, characterized in that the hardener (b) is 4, 4'-diamino 3, 3'-dimethyl dicyclohexyl methane and (a,ii) comprising the polyglycidyl ethers of phenol/cresol-formaldehyde novolacs or a mixture thereof.

Chinese patent no. 1255449C discloses a epoxy resin composition comprising: (A) per molecule containing at least two epoxy groups in the epoxide, (B) a polyol containing per molecule or at least two hydroxyl groups per molecule containing at least two amino-hydrogen atoms a primary or secondary amine, and (C) at least two isocyanate groups of the solid compound; the composition shows high storage stability, and can be used as protective coatings or adhesives, characterized in that component A is a diglycidyl ether or diglycidyl ester and component B is 4,4'-diamino-3,3'-dimethyl dicyclohexyl methane.

PCT application no. 2013130378 discloses a short-cure resin composition containing: (a) at least one multifunctional epoxy resin having an epoxy functionality of greater than 1; (b) a hardener composition containing (i) at least one aliphatic or cycloaliphatic amine curing agent having one or more amino groups per molecule; (ii) at least one aromatic amine curing agent having one or more amino groups per molecule; and optionally, (iii) an imidazole as curing accelerator, characterized in that said multifunctional epoxy resin is phenol and cresol epoxy novolacs, diglycidyl ethers of diene-modified phenolic novolacs, glycidyl ethers of phenolaldelyde adducts.

European patent application no. 0387554 discloses a liquid epoxy composition containing:
A) A diglycidyl ether of a dihydric phenol epoxide or diglycidyl ether of a tetrabrominated dihydric phenol, or mixtures thereof;
B) Epoxy having epoxide functionality of 2.2 to 4; and
C) An amount sufficient for curing of a cycloaliphatic diamine, and
D) thixotropic agent,
Wherein B is an epoxidized novolak and polyamine C is a primary cycloaliphatic diamine and include diaminocyclohexane.

U.S. Pat. No. 4,525,542 disclosed a novolac based epoxy resin curing agent comprising the reaction product of an epoxy novolac compound, a primary amine containing polyamine and a monoepoxide, wherein substantially all of the epoxy groups are reacted with the polyamines and wherein at least substantially all of the unreacted primary amine groups in the polyamine/epoxide reaction product groups are further reacted with the monoepoxide, wherein novolac is a phenol/formaldehyde based novolac, the polyamine is a polyalkylenepolyamine.

US patent application no. 20140186536 discloses a curable epoxy resin composition comprising (a) at least one epoxy resin; and (b) at least one hardener; wherein the curable epoxy resin composition has at least two exotherm peaks representing at least two distinct chemical reactions, wherein the at least one epoxy resin (a) comprises (a1) at least a first epoxy resin; and (a2) at least a second epoxy resin different from the first epoxy resin, wherein the at least one hardener (b) comprises (b1) at least a first hardener, and (b2) at least a second hardener different from the first hardener. The first epoxy resin; and the second epoxy resin each separately and individually may comprise a divinylarene dioxide, a polyglycidyl ether, or a combination thereof. The first and second hardeners each separately and individually may comprise aliphatic amines, aromatic amines, cycloaliphatic amines, carbodiimides, ureas, guanidines, phenols, aliphatic alcohols, mercaptans, anhydrides, and mixtures thereof.

U.S. Pat. No. 3,316,323 relates to elastic molded articles and coatings from epoxide resins with low absorption values for humidity, the composition comprising of phenolic epoxy resins, mixed with polyetheralcoholdiglycidyl ethers and a hardening agent.

GB patent no. 1366603 discloses a method of preparing clear flexibilized epoxy resins at room temperature by reacting epoxy resin with a triepoxide flexibilizer and a hardener.

U.S. Pat. No. 4,532,308 discloses an epoxy resin composition comprising of (a) an epoxy compound having a spiroacetal ring, (b) a brominated epoxy resin (c) a novolac type epoxy resin and (d) a hardening agent.

European patent no. 2220162B1 discloses vibration dampening compositions based on epoxy-resins comprising (a) one or more rigid epoxy resin, (b) one or more flexible epoxy resin, (c) a first set of hollow organic microspheres, (d) a second set of hollow inorganic microspheres and (e) a curing agent capable of cross linking the rigid and flexible epoxy resins.

European patent application no. 0780435A1 discloses a flexible epoxy resin composition having low bleeding tendency comprising epoxy resin, a flexibilizing agent, a curing agent and fillers with addition of polyhydroxy compounds.

Many reports are available in the literature on the above mentioned tougheners/flexibilizers. However, new tougheners/flexibilizers based on bio-derived chemicals are not fully explored and information on these materials is scarce in the literature.

OBJECT OF THE INVENTION

The main objective of the present invention is to provide novel epoxy novolac composites comprising an epoxy novolac resin; a hardener and polyglycidyl ether of epoxy resin as flexibilizer, characterized in that impact strength of the said composite is in the range of 25 J/m to 69 J/m.

The another object of the present invention is to provide novel epoxy novolac composites prepared by using toughening agent based on bio-derived chemicals such as cardolites.

SUMMARY OF THE INVENTION

To overcome the drawback of the literature, the present inventors developed epoxy novolac composites with effective toughening of brittle epoxy novolac resin (PPGEF) using cardanol based epoxy resins (Cardolite NC-514 and Cardolite NC-547) used as modifiers. The performance of toughening was measured in terms of mechanical properties such as impact strength, tensile strength and % elongation.

The term modifier used in this invention is interchangeable with flexibilizer or bio-derived modifier.

Accordingly, the present invention provides novel epoxy novolac composites comprising;
a) an epoxy novolac resin;
b) hardener for curing epoxy novolac resin;
c) Polyglycidyl ether of epoxy resin as flexibilizer;
characterized in that impact strength of the said composite is in the range of 24 J/m to 69 J/m.

In an embodiment of the present invention wherein said epoxy novolac resin (a) is poly [(phenylglycidyl ether)-co-formaldehyde] (PPGEF).

In another embodiment of the present invention wherein hardener (b) is selected from the group consisting of 4,4'-diamino-3,3'-dimethyldicyclohexyl methane (BMCHA), diethylene triamine, triethylene tetramine, 4,4'-diaminodiphenylsulfone, 4,4'-diaminodiphenyl ether, 4,4'-diaminodiphenylmethane, dicyandiamide, methyl hexahydrophthalic anhydride, isophorone diamine, bis(4-aminocyclohexyl) methane, methylenedianiline and meta-phenylenediamine.

In still another embodiment of the present invention wherein said polyglycidyl ether of epoxy resin (c) is selected from di-functional glycidyl ether epoxy resin (Cardolite NC-514) and polyglycidyl ether of an alkenyl phenol formaldehyde novolac resin (Cardolite NC-547).

In preferred embodiment of the present invention, the tensile strength of said composite is in the range of 63 MPa to 77 MPa.

In another embodiment, the glass transition temperature (Tg) of said composite is in the range of 90° C. to 120° C.

In still another embodiment of the present invention, the flexibilizer to resin is in the range of 5 to 30 wt %.

In yet another embodiment of the present invention, the hardener to resin is in the range of 1 to 1.5 equivalents.

The present invention also provides a process for preparation of epoxy novoloc composite comprising:
a. mixing epoxy novolac resin with bio-derived modifier/flexibilizer in amounts ranging from 5 to 30 wt % to obtain mixture; and
b. adding hardener to the mixture of step (a) in amounts ranging from 1-1.5 equivalents to obtain the composite.

In an embodiment of the present invention, the epoxy novolac resin is poly [(phenylglycidyl ether)-co-formaldehyde] (PPGEF).

In another embodiment of the present invention, the natural modifier/flexibilizer is polyglycidyl ether of epoxy resin which is selected from -di-functional glycidyl ether epoxy resin (Cardolite NC-514) and polyglycidyl ether of an alkenyl phenol formaldehyde novolac resin (Cardolite NC-547).

In another embodiment of the present invention, the hardener is selected from a group comprising of 4,4'-Diamino-3,3'-dimethyldicyclohexyl methane (BMCHA) diethylene triamine, triethylene tetramine, 4,4'-diaminodiphenylsulfone, 4,4'-diaminodiphenyl ether, 4,4'-diaminodiphenylmethane, dicyandiamide, methyl hexahydrophthalic anhydride, isophorone diamine, bis(4-aminocyclohexyl)methane, methylenedianiline or meta-phenylenediamine.

LIST OF ABBREVIATIONS

Poly[(phenylglycidyl ether)-co-formaldehyde] (PPGEF)
4,4'-Diamino-3,3'-dimethyldicyclohexyl methane (BMCHA)
Di-functional glycidyl ether epoxy resin (Cardolite NC-514)
Polyglycidyl ether of an alkenyl phenol formaldehyde novolac resin (Cardolite NC-547)

DETAILED DESCRIPTION OF THE INVENTION

The invention will now be described in detail in connection with certain preferred and optional embodiments, so that various aspects thereof may be more fully understood and appreciated.

In view of above, the present invention provides novel epoxy novolac composites and process for preparation thereof.

In an embodiment, the present invention provides epoxy novolac composites comprising:
a) an epoxy novolac resin; and
b) a hardener;
c) Polyglycidyl ether of epoxy resin as flexibilizer;
characterized in that impact strength of the said composite is in the range of 24 J/m to 69 J/m.

In an embodiment, said epoxy novolac resin (a) is poly [(phenylglycidyl ether)-co-formaldehyde] (PPGEF).

In another embodiment, said wherein hardener (b) is selected from 4,4'-diamino-3,3'-dimethyldicyclohexyl methane (BMCHA), diethylene triamine, triethylene tetramine, 4,4'-diaminodiphenylsulfone, 4,4'-diaminodiphenylether, 4,4'-diaminodiphenylmethane, dicyandiamide, methyl hexahydrophthalic anhydride, isophorone diamine, bis(4-aminocyclohexyl)methane, methylenedianiline and meta-phenylenediamine.

In still another embodiment, said polyglycidyl ether of epoxy resin (c) is selected from di-functional glycidyl ether epoxy resin (Cardolite NC-514) and polyglycidyl ether of an alkenyl phenol formaldehyde novolac resin (Cardolite NC-547).

The Differential scanning calorimetry and dynamic mechanical thermal analysis of the composites showed a gradual decrease in glass transition temperatures ($T_g$) with increase in cardolite content confirming the incorporation of flexible moieties into the brittle resin matrix. Improvement in toughening of PPGEF/Cardolite composites is manifested by increase in the izod impact strength of both the composites.

The tensile strength increased marginally for composites with increasing amount of Cardolite NC-514 but, decreased for the composites containing Cardolite NC-547. This is due to restricted freedom of motion in NC-547. SEM of the cryo-fractured surfaces of composites showed good compatibility between PPGEF and cardanol based flexibilizers.

In preferred embodiment, tensile strength of said composite is in the range of 63 MPa to 77 MPa.

In another preferred embodiment, the glass transition temperature (Tg) of said composite is in the range of 120° C. to 90° C.

In still another preferred embodiment, the ratio of flexibilizer to resin is in the range of 5 to 30 wt %.

In yet another preferred embodiment, the ratio of hardener to resin is in the range of 1 to 1.5 equivalents.

The Epoxy novolac composites are prepared by the reaction between PPGEF with a curing agent BMCHA in presence of Cardolite NC-514 or Cardolite NC-547. The composites with different contents of flexibilizers are prepared and examined for their structural, thermal and mechanical properties.

Figures 1A, 1B:
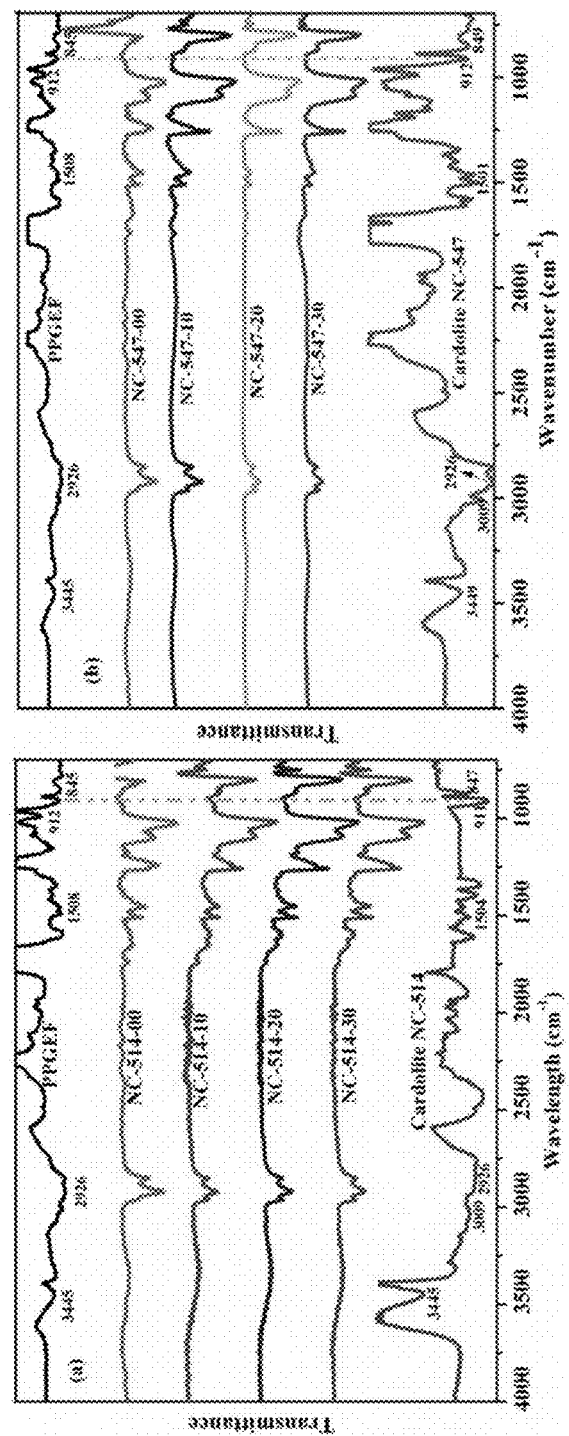
FIG. 1: FTIR spectra for (a) PPGEF/Cardolite NC-514 and (b) PPGEF/Cardolite NC-547 composites

The FT-IR spectra of neat PPGEF, Cardolite NC-514, Cardolite NC-547 along with cured epoxy novolac composites containing different amounts of cardolites are shown in FIGS. 1(a) and 1(b). The neat PPGEF resin showed characteristic peaks at 912 cm$^{-1}$ and 860 cm$^{-1}$ which correspond to the oxirane rings. These oxirane ring peaks also appeared in neat Cardolite samples. The peak at 3445 cm$^{-1}$ corresponds to the —OH groups of both neat PPGEF and cardolites. The C—C stretching of aromatic groups in all the samples appeared at 1508 cm$^{-1}$.

The reaction between PPGEF and Cardolite in presence of curing agent BMCHA resulted into disappearance of oxirane peaks at 912 cm$^{-1}$ and 860 cm$^{-1}$ from the epoxy novolac composites. These observations confirmed the incorporation of cardolite flexibilizers in epoxy novolac composites.

Figures 2A, 2B:
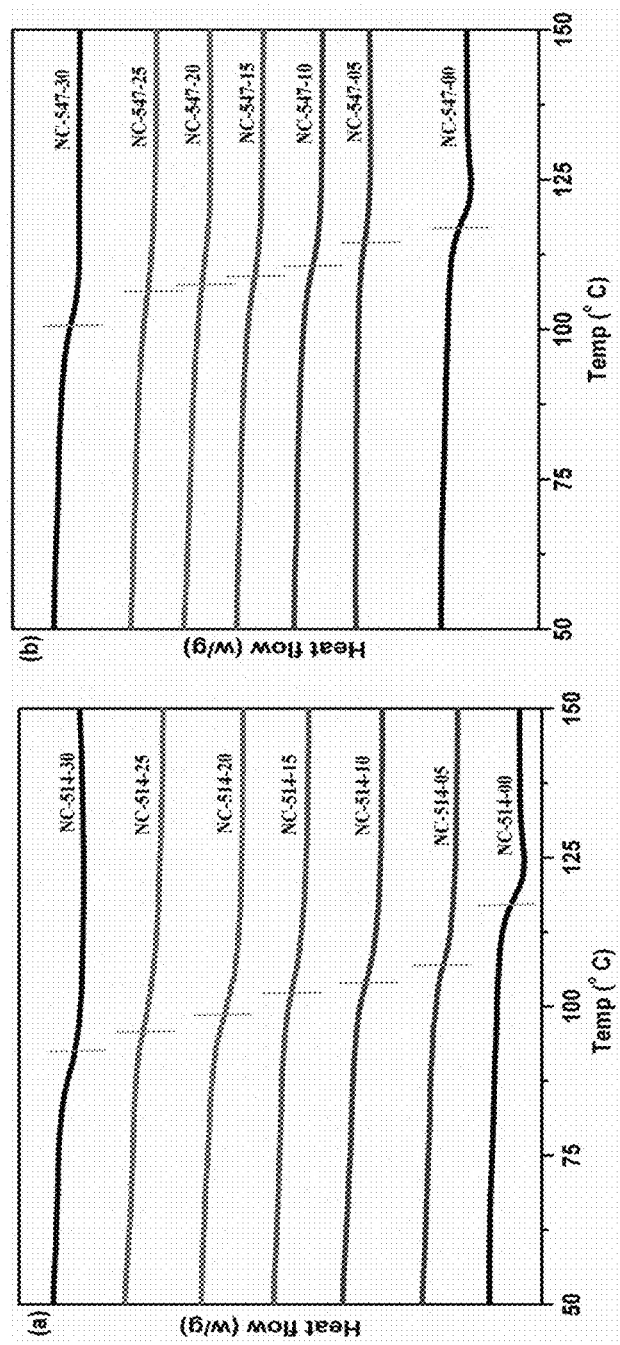
FIG. 2: Differential Scanning Calorimetry curves for (a) PPGEF/NC-514 and (b) PPGEF/NC-547 composites

The DSC curves of epoxy novolac composites with different loadings of Cardolite NC-514 or Cardolite NC-547 along with the neat epoxy novolac (PPGEF) are shown in FIGS. 2(a) and 2(b). The decrease in $T_g$ may be attributed to the flexibilizing effect of the cardolites. Although the cardolites are chemically linked to the novolac epoxy by crosslinking, the value of $T_g$ is not altered.

Thermal degradation of neat PPGEF and epoxy novolac composites with cardolite flexibilizer is studied by thermogravimetric analysis in the air atmosphere. The TGA curves of neat resin (PPGEF) and the epoxy novolac composites with different contents of Cardolite NC-514 and Cardolite NC-547 are shown in FIGS. 3(a) and 3(b) respectively.

Figures 3A, 3B:
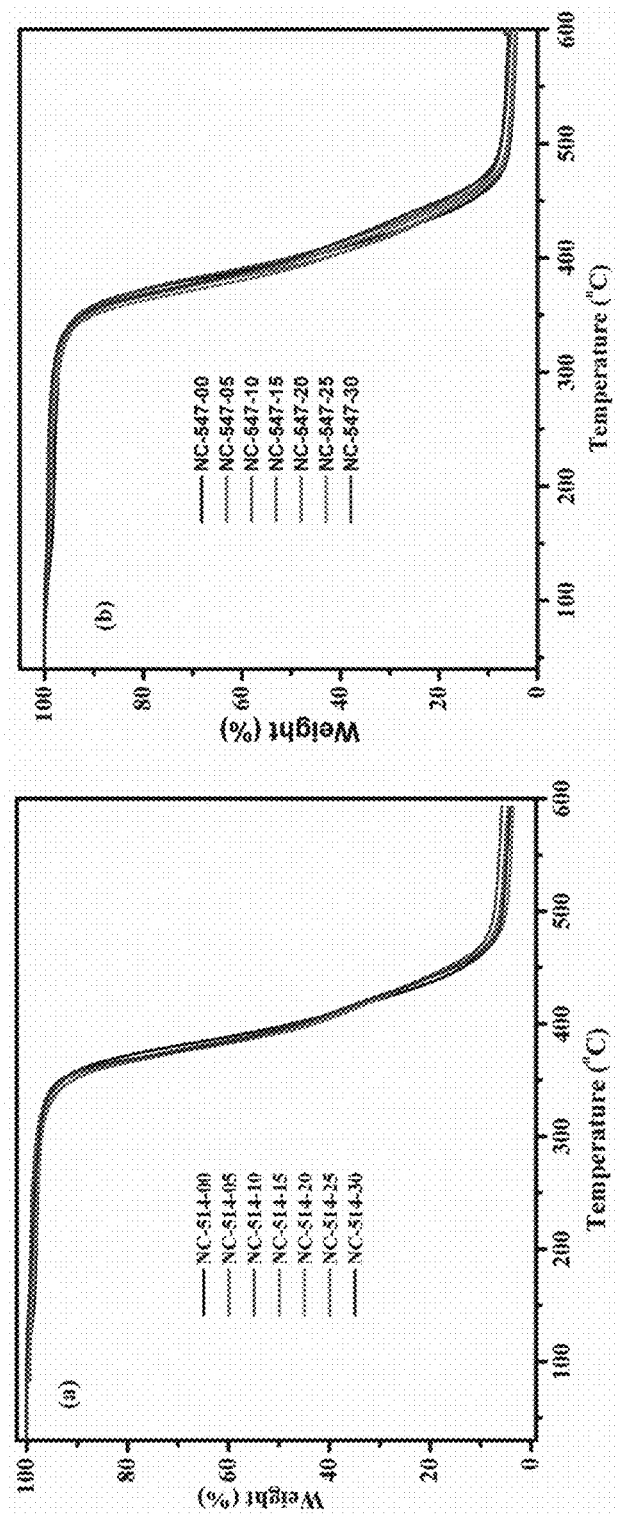
FIG. 3: Thermogravimetric analysis curves for (a) NC-514 and (b) NC-547 composites

The FIGS. 3(a) and 3(b) shows that all the composites have shown one-step degradation. Tables 2(a) and 2(b) show the results of TGA for PPGEF/Cardolite NC-514 and PPGEF/Cardolite NC-547 composites. It is observed that the char residue at 600° C. (char yield) is slightly higher in the case of epoxy novolac with Cardolite NC-547 which may be due to more number of aromatic rings present in the Cardolite NC-547.

Figures 4A, 4B:
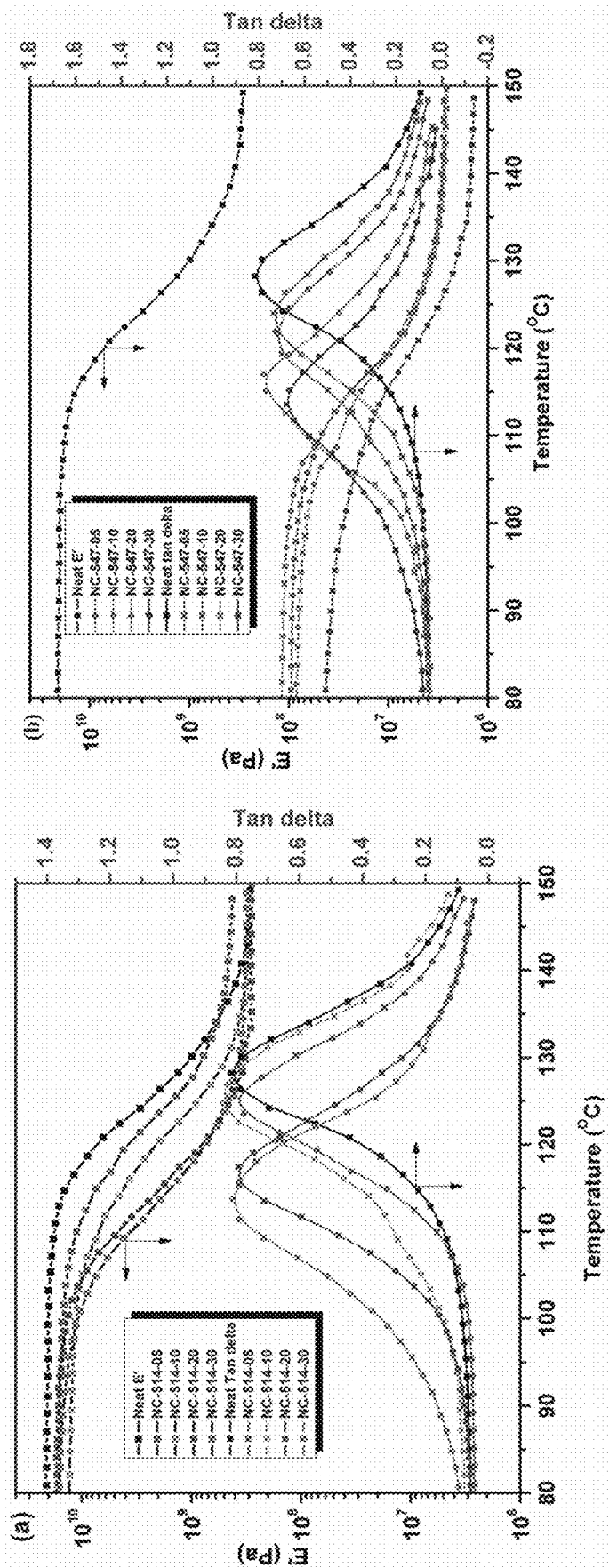
FIG. 4: Storage modulus (E') and Tan δ plots of (a) PPGEF/Cardolite NC-514 and (b) PPGEF/Cardolite NC-547 composites

The storage modulus (E') and the tan δ values of the cured neat epoxy novolac composite and epoxy novolac composites containing 5, 10, 20, 30 wt % of Cardolite NC-514 and Cardolite NC-547 as a function of temperature are shown in FIGS. 4(a) and 4(b). A single glass transition temperature ($T_g$) with a clear rubbery plateau region is observed. The storage modulus decreased gradually with the addition of cardolite revealing the increased flexibility of the epoxy novolac composites. The storage modulus also dropped with increasing temperature and passed through $T_g$ region before reaching the rubbery plateau, where the segmental motions of the network chain occur cooperatively The incorporation of Cardolite NC-514 and Cardolite NC-547 flexibilizers in novolac epoxy resins affected the mechanical properties of the final cured epoxy novolac composites. The results are summarized in Table 3. The results show that in the case of composites with Cardolite NC-514, the tensile and impact strength increased with increase in cardolite content from 5 to 30 wt %. However, there is hardly any change in the % elongation w. r. t. increase in cardolite content. While the tensile strength increased by 5-6%, more effect of flexibilizer was seen in impact strength which increased from 31.7 J/m to 68.6 J/m with Cardolite NC-514 content from 5 to 30 wt %. The increase in impact strength may be attributed to the presence of flexible chains in the backbone of the Cardolite NC-514, which can absorb an appreciable amount of energy under the impact.

Figures 5A, 5B:
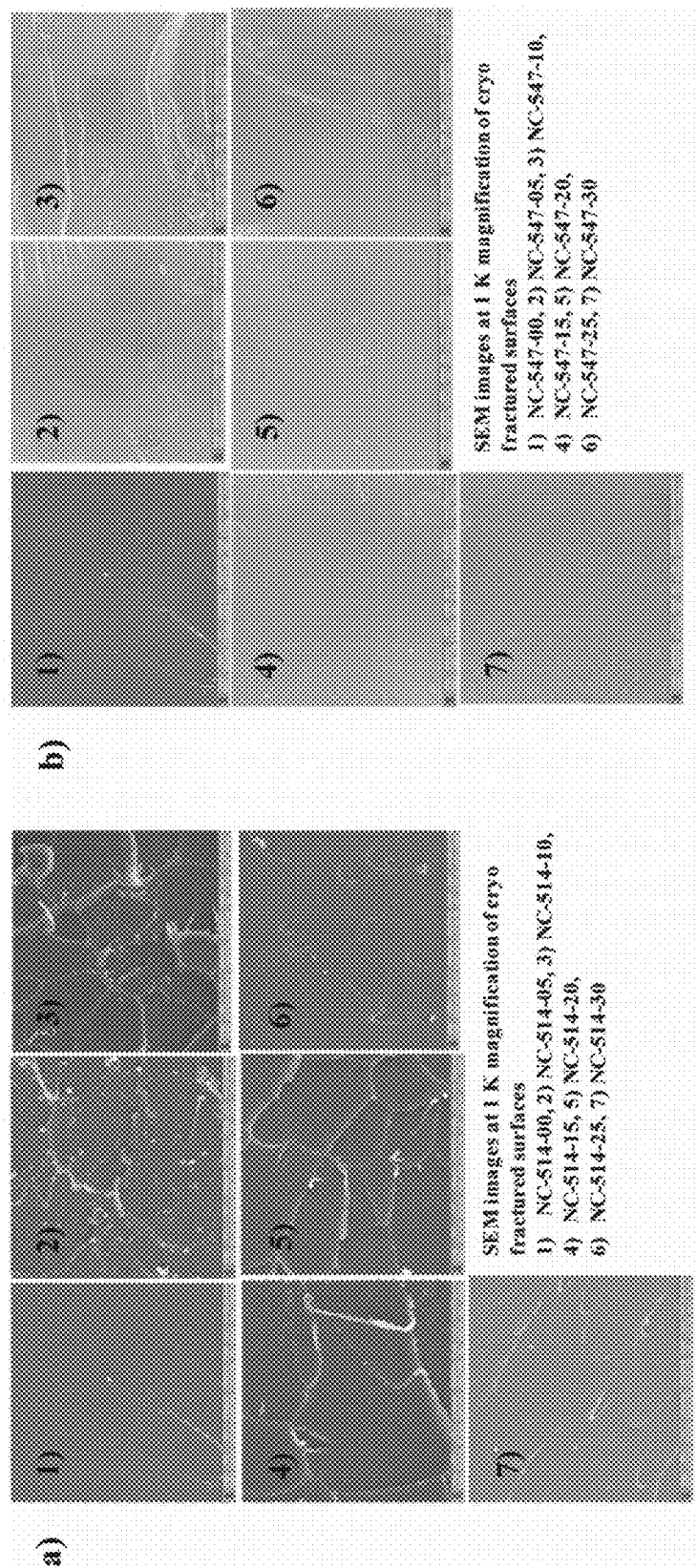
FIG. 5: Scanning electron microscopy images for
a) PPGEF/Cardolite NC-514 composites
b) PPGEF/Cardolite NC-547 composites
Figure 6:
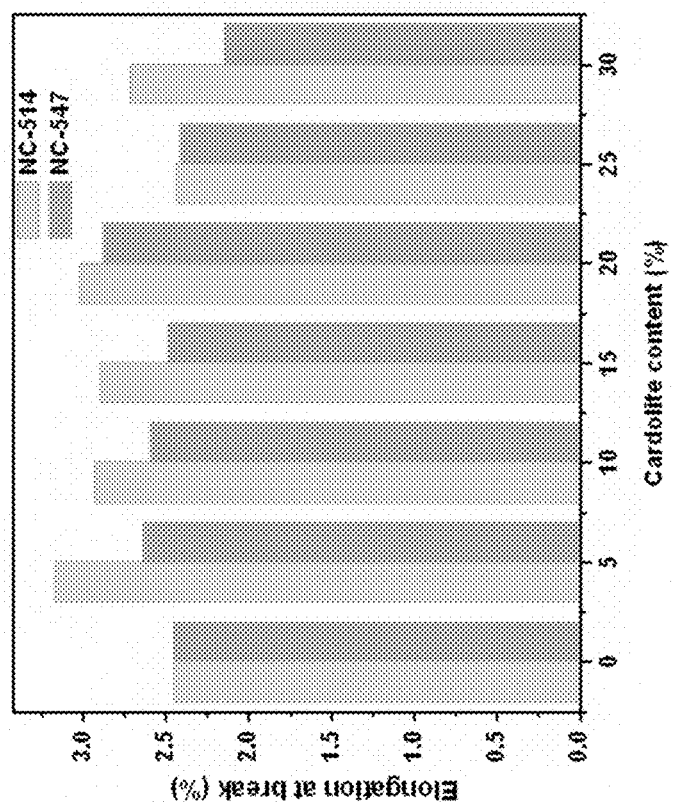
FIG. 6: % Elongation verses Cardolite content for PPGEF-Cardolite composites
Figure 7:
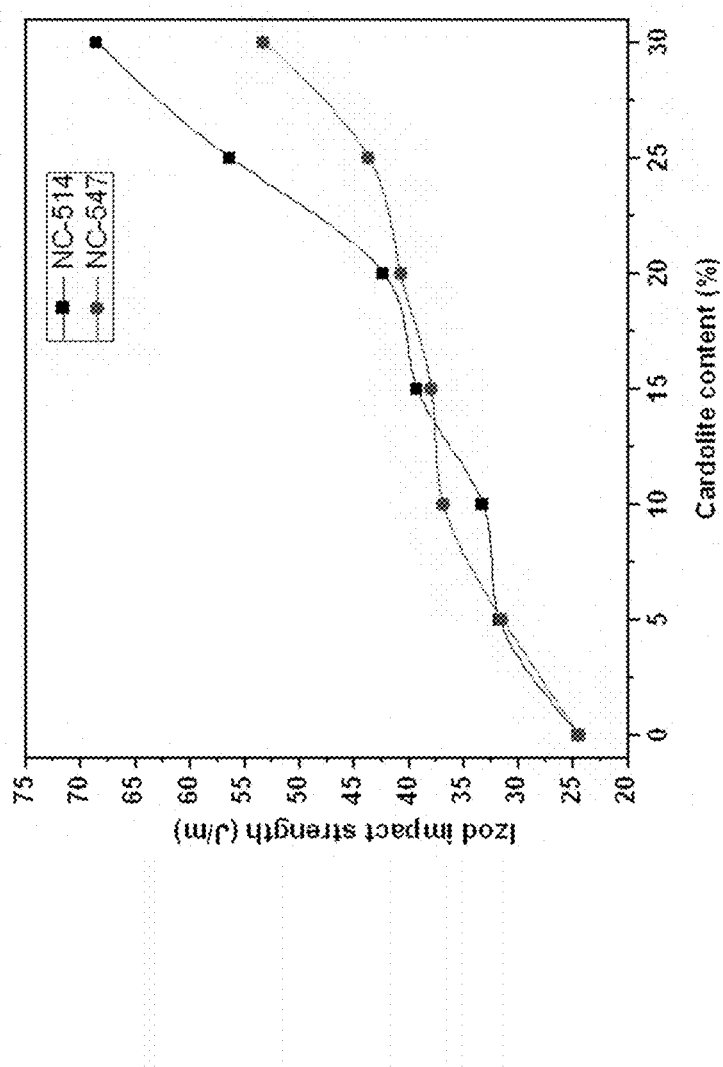
FIG. 7: Izod impact strength comparison for PPGEF-Cardolite composites

The SEM images of the cryo fractured specimens for cured neat and cardolite incorporated epoxy novolac composites are shown in FIG. 5. The specimens are scanned at a magnification of 1K. The fractured surface of the neat composite [FIG. 5(a.1) or 5(b.1)] shows a very smooth and plain morphology, which indicate that the fracture is brittle. In all the scanned images, no phase separation is observed which clearly indicates the compatibility of PPGEF and Cardolite NC-514/Cardolite NC-547. The figures FIG. 5(a) (2-7) shows that the fracture is ductile for the PPGEF/Cardolite NC-514 composites influenced by the incorporation of Cardolite NC-514. For PPGEF/Cardolite NC-547 composites the FIG. 5(b) (2-7) shows the fractured surfaces indicate the homogeneity of PPGEF and Cardolite NC-547 upon curing.

In another embodiment, the present invention provides a process for preparation of epoxy novoloc composite comprising:
a. Mixing epoxy novolac resin with bio-derived modifierin different amounts ranging from 5% to 30% per hundred resin (phr) varying by 5% in each composition to obtain mixture;
b. Adding hardener to the mixture of step (a) to obtain the composite.

In preferred embodiment, said epoxy novolac resin is poly [(phenylglycidyl ether)-co-formaldehyde] (PPGEF).

In another preferred embodiment, said bio-derived modifier is polyglycidyl ether of epoxy resin which is selected from di-functional glycidyl ether epoxy resin (Cardolite NC-514) and polyglycidyl ether of an alkenyl phenol formaldehyde novolac resin (Cardolite NC-547).

In still another preferred embodiment, the present invention provides a process for preparation of composition wherein the hardener is selected from the following: 4,4'-diamino-3,3'-dimethyldicyclohexyl methane (BMCHA) diethylene triamine, triethylene tetramine, 4,4'-diaminodiphenylsulfone, 4,4'-diaminodiphenyl ether, 4,4'-diaminodiphenylmethane, dicyandiamide, methyl hexahydrophthalic anhydride, isophorone diamine, bis(4-aminocyclohexyl) methane, methylenedianiline or meta-phenylenediamine The process for the preparation of epoxy novoloc composite is as shown in below scheme 1:

Scheme 1: Reaction between PPGEF, BMCHA and Cardolite NC-514/Cardolite NC-547

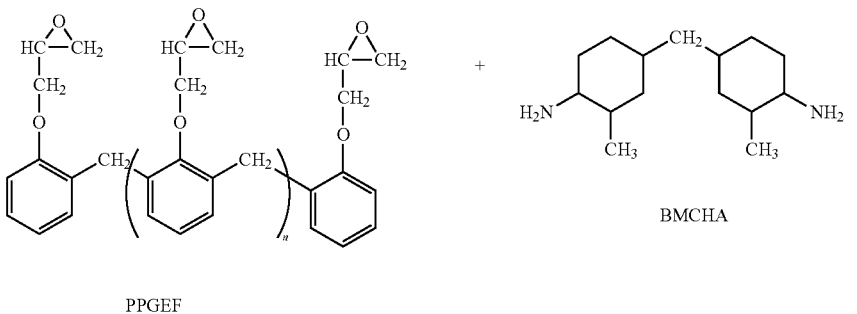

PPGEF

BMCHA

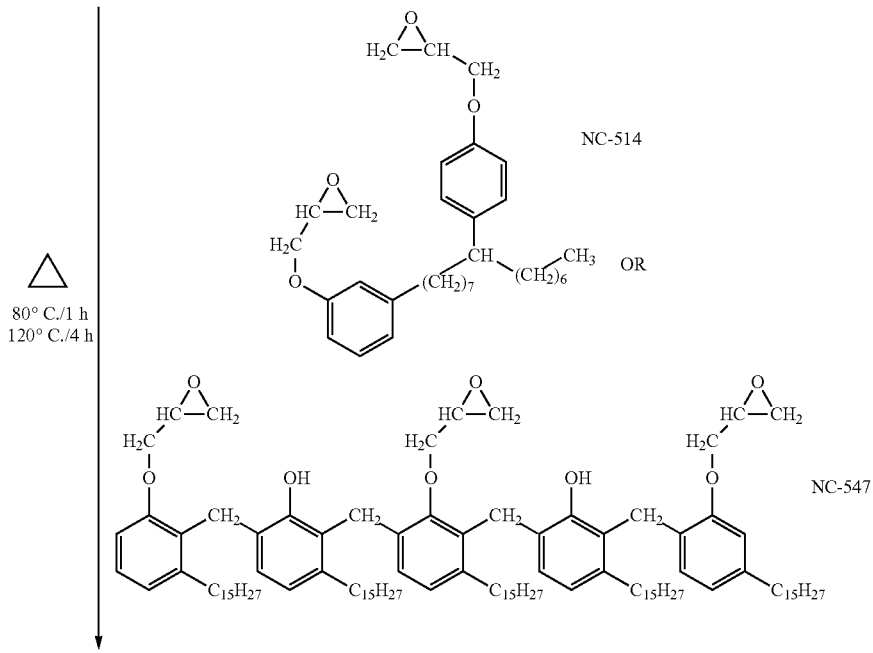

NC-514

OR

NC-547

80° C./1 h
120° C./4 h

-continued
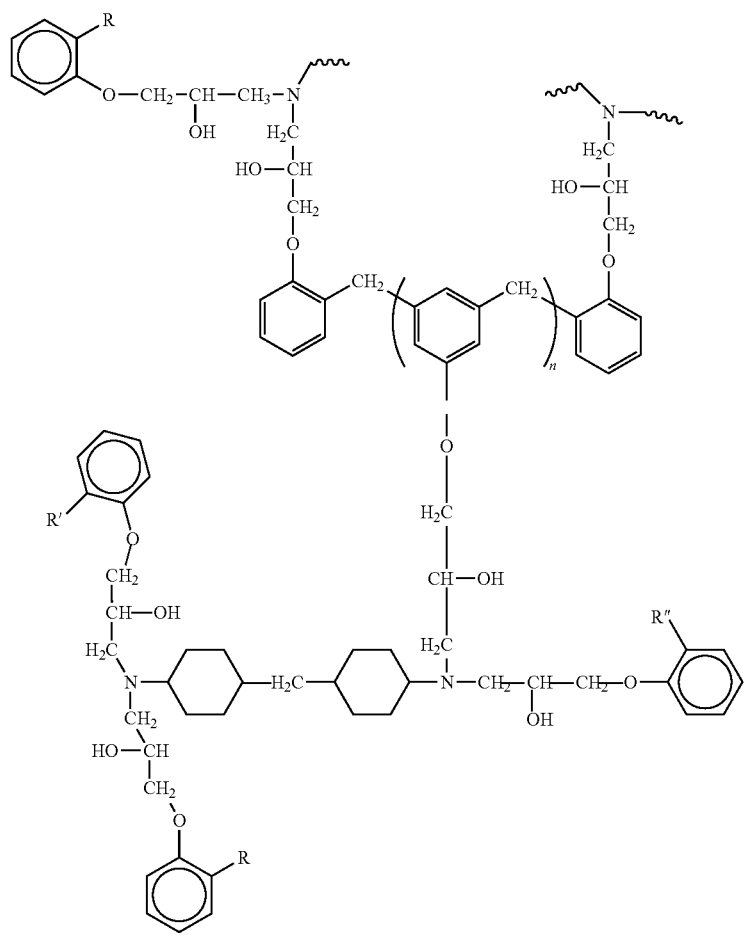
Epoxy novolac composite
Where,
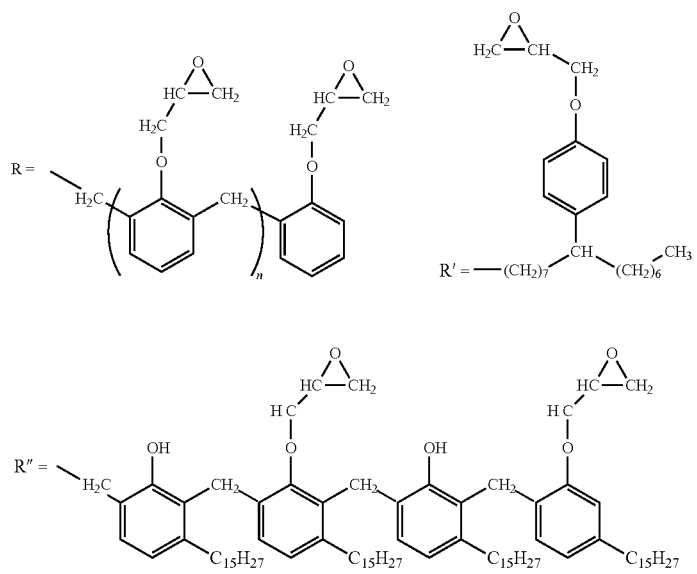

EXAMPLES

The following examples, which include preferred embodiments, will serve to illustrate the practice of this invention, it being understood that the particulars shown are by way of example and for purpose of illustrative discussion of preferred embodiments of the invention.

Example 1: Preparation of Composites with Cardolite NC-514

Epoxy novolac composites were prepared by two step mixing process. Initially, PPGEF was mixed with Cardolite NC-514 in a beaker in different amounts ranging from 5-30% per hundred resins. To this mixture, a stoichiometric amount of BMCHA was added. The composite was thoroughly mixed and vacuum was applied to remove the entrapped air bubbles. All the mixing was performed at ambient temperature. It was then poured in greased PTFE mould following the cure schedule of 80° C./1 h and further 120° C./4 h. The mould was cooled and the cured specimens were taken out for further characterization. Similarly, epoxy novolac composites with Cardolite NC-514 were prepared by varying its content upto 30% per hundred PPGEF. The sample code for example is denoted as follows: NC-514-00 corresponds to the neat epoxy novolac composite. NC-514-05 corresponds to the composites containing 5% Cardolite etc.

| Ingredients | (Composition) Sample code | | | | | |
|---|---|---|---|---|---|---|
| | NC-514-05 | NC-514-10 | NC-514-15 | NC-514-20 | NC-514-25 | NC-514-30 |
| PPGEF (equivalents) | 1 | 1 | 1 | 1 | 1 | 1 |
| BMCHA (equivalents) | 1.5 | 1.5 | 1.5 | 1.5 | 1.5 | 1.5 |
| Cardolite NC-514 (%) | 5 | 10 | 15 | 20 | 25 | 30 |

Example 2: Preparation of Composites with Cardolite NC-547

Epoxy novolac composites using Cardolite NC-547 were prepared in a similar way as described in example 1 by two step mixing process. Initially, PPGEF was mixed with Cardolite NC-547 in a beaker in different amounts ranging from 5-30% per hundred resin. To this mixture, a stoichiometric amount of BMCHA was added. The composite was thoroughly mixed and vacuum was applied to remove the entrapped air bubbles. All the mixing was performed at ambient temperature. It was then poured in greased PTFE mould following the cure schedule of 80° C./1 h and further 120° C./4 h. The mould was cooled and the cured specimens were taken out for further characterization. Similarly, epoxy novolac composites with Cardolite NC-547 were prepared by varying its content upto 30% per hundred PPGEF. The sample code for example is denoted as follows: NC-547-00 corresponds to the neat epoxy novolac composite. NC-547-05 corresponds to the composites containing 5% Cardolite etc.

| Ingredients | (Composition) Sample code | | | | | |
|---|---|---|---|---|---|---|
| | NC-547-05 | NC-547-10 | NC-547-15 | NC-547-20 | NC-547-25 | NC-547-30 |
| PPGEF (equivalents) | 1 | 1 | 1 | 1 | 1 | 1 |
| BMCHA (equivalents) | 1.5 | 1.5 | 1.5 | 1.5 | 1.5 | 1.5 |
| Cardolite NC-547 (%) | 5 | 10 | 15 | 20 | 25 | 30 |

Example 3: Characterization of Composites

A. Fourier Transform Infrared Spectroscopy (FT-IR):

FT-IR spectra of the composite films were recorded on a Perkin Elmer Spectrum GX FT-IR spectrometer in the range of 4000 to 750 cm$^{-1}$ with a resolution of 4 cm$^{-1}$. The measurements were performed in the ATR mode.

The FT-IR spectra of neat PPGEF, Cardolite NC-514, Cardolite NC-547 along with cured epoxy novolac composites containing different amounts of cardolites are shown in FIGS. 1(a) and 1(b). The neat PPGEF resin showed characteristic peaks at 912 cm$^{-1}$ and 845 cm$^{-1}$ which correspond to the oxirane rings. These oxirane ring peaks also appeared in neat Cardolite samples. The peak at 3445 cm$^{-1}$ corresponds to the —OH groups of both neat PPGEF and cardolites. The C—C stretching of aromatic groups in all the samples appeared at 1608 cm$^{-1}$.

The reaction between PPGEF with a curing agent BMCHA in presence of Cardolite resulted into disappearance of oxirane peaks at 912 cm$^{-1}$ and 845 cm$^{-1}$ from the epoxy novolac composites. These observations confirmed the incorporation of cardolite flexibilizers in epoxy novolac composites.

B. Differential Scanning Colorimetry (DSC):

DSC experiments were performed using DSC Q10 TA Thermal Analyzer using aluminum sample pans. The samples were heated from 25° C. to 225° C. with a heating rate of 10° C./min in the nitrogen atmosphere with a flow rate of 50 ml/min. Glass transition temperature ($T_g$), curing temperature and extent of curing were studied from the DSC thermograms.

The DSC curves of epoxy novolac composites with different loadings of Cardolite NC-514 or Cardolite NC-547 along with the neat epoxy novolac (PPGEF) are shown in FIGS. 2(a) and 2(b). It can be readily seen that all the samples exhibited single $T_g$ indicating no phase separation. The neat epoxy novolac resin (PPGEF) showed the $T_g$ of 120° C. Upon incorporating cardolites, the decrease in $T_g$ was observed with increasing amounts of cardolites. A similar trend was observed in the DMTA measurements also (see Table 1). The decrease in $T_g$ can be attributed to the flexibilizing effect of the cardolites. Although the cardolites were chemically linked to the novolac epoxy by crosslinking, the value of $T_g$ did not alter. It may be due to the fact that the flexibility of the cardolite is more dominant as compared to the crosslinking of PPGEF.

It was also observed that in the case of Cardolite NC-514, the $T_g$ decreased from 120° C. (neat PPGEF) to 90° C. (30 wt % Cardolite NC-514) upon incorporating cardolite NC-514. Whereas, the decrease in $T_g$ with Cardolite NC-547 (30 wt % Cardolite NC-547) was only up to 100° C. The relatively more decrease in $T_g$ with Cardolite NC-514 at the same loading can arise from more flexible nature of Cardolite NC-514 in which the flexible chain is situated in the backbone of the cardolite chemical structure. On the other hand, Cardolite NC-547 contains flexible groups in the side chain of the backbone and might induce less flexibility to the epoxy novolac composites. Further, Cardolite NC-547 with more number of epoxide groups can lead to more crosslinking during the curing reaction resulting in the overall decrease of flexibility of Cardolite NC-547 incorporated epoxy novolac composites. These observations were clearly seen in the DSC studies.

TABLE 1

$T_g$ from DSC and DMTA analysis for PPGEF/NC-514 and PPGEF/NC-547 composites

| | | $T_g$ by DSC (° C.) | | $T_g$ from tan δ peaks DMTA (° C.) | |
|---|---|---|---|---|---|
| Sr. No. | Cardolite Content (Wt. %) | PPGEF/ Cardolite NC-514 composites | PPGEF/ Cardolite NC-547 composites | PPGEF/ Cardolite NC-514 composites | PPGEF/ Cardolite NC-547 composites |
| 1. | 00 | 120 | 120 | 128 | 128 |
| 2. | 05 | 110 | 116 | 122 | 121 |
| 3. | 10 | 108 | 112 | 120 | 119 |
| 4. | 15 | 106 | 109 | 119 | 119 |
| 5. | 20 | 102 | 108 | 116 | 118 |
| 6. | 25 | 100 | 106 | 115 | 117 |
| 7. | 30 | 90 | 100 | 112 | 116 |

TGA measurements were performed on a Perkin Elmer STA 6000 thermogravimetric analyzer. Around 10-15 mg sample was placed in a ceramic crucible and heated from 25° C. to 600° C. at a heating rate of 10° C./min in an air atmosphere with a flow rate of 30 ml/min. The initial decomposition temperature at 5% weight loss ($T_{5\%}$), the temperature at which maximum degradation occurs ($T_{max\%}$), the temperature where 50% decomposition occurs ($T_{50\%}$) as well as char residue at 600° C. were noted from TGA thermograms.

Thermal degradation of neat PPGEF and epoxy novolac composites with cardolite flexibilizer was studied by thermogravimetric analysis in the air atmosphere. The TGA curves of neat resin (PPGEF) and the epoxy novolac composites with different contents of Cardolite NC-514 and Cardolite NC-547 are shown in FIGS. 3(a) and 3(b) respectively.

TABLE 2 (a)

Results of TGA in Air of PPGEF/Cardolite NC-514 composites

| Sr. No. | Sample code | $T_{5\%}$ (° C.) | $T_{50\%}$ (° C.) | $T_{max\%}$ (° C.) | Char residue @ 600° C. (%) |
|---|---|---|---|---|---|
| 1. | NC-514-00 (neat) | 342 | 420 | 470 | 0 |
| 2. | NC-514-05 | 343 | 425 | 476 | 3 |
| 3. | NC-514-10 | 337 | 424 | 478 | 3 |
| 4. | NC-514-15 | 337 | 422 | 478 | 4 |
| 5. | NC-514-20 | 336 | 391 | 477 | 3 |
| 6. | NC-514-25 | 344 | 393 | 478 | 3 |
| 7. | NC-514-30 | 341 | 395 | 475 | 3 |

TABLE 2 (b)

Results of TGA in Air of PPGEF/Cardolite NC-547 composites

| Sr. No. | Sample code | $T_{5\%}$ (° C.) | $T_{50\%}$ (° C.) | $T_{max\%}$ (° C.) | Char residue @ 600° C. (%) |
|---|---|---|---|---|---|
| 1. | NC-547-00 (neat) | 342 | 420 | 470 | 0 |
| 2. | NC-547-05 | 341 | 393 | 476 | 4 |
| 3. | NC-547-10 | 336 | 401 | 482 | 4 |
| 4. | NC-547-15 | 340 | 396 | 476 | 5 |
| 5. | NC-547-20 | 334 | 390 | 474 | 3 |
| 6. | NC-547-25 | 331 | 395 | 475 | 3 |
| 7. | NC-547-30 | 341 | 399 | 482 | 2 |

It can be seen from the figure that all the composites have shown one-step degradation. Tables 2(a) and 2(b) show the results of TGA for PPGEF/Cardolite NC-514 and PPGEF/Cardolite NC-547 composites. The 5% weight loss temperature ($T_{5\%}$) that corresponds to the temperature when 5% of initial weight was lost, decreased with an increase in the cardolite content. However, the decrease was not significant. The major weight loss was found to occur in the temperature range of 300-500° C. in all the epoxy novolac composites. About 50% degradation occurs at around 400° C. which is denoted as $T_{50\%}$. The maximum degradation was observed in the temperature range of 470-480° C. due to the oxidative degradation in the presence of air. It was also observed that the char residue at 600° C. (char yield) was slightly higher in the case of epoxy novolac with Cardolite NC-547 which may be due to more number of aromatic rings present in the Cardolite NC-547.

D. Dynamic Mechanical Thermal Analysis (DMTA)

Dynamic Mechanical Thermal Analysis (DMTA) studies were performed on a Rheometric Scientific DMTA dynamic mechanical analyzer to evaluate the viscoelastic properties of the epoxy novolac composites. In the dynamic mode, the samples were heated from 40° C. to 150° C. with a heating rate of 10° C./min. Three point bending method was used at a frequency of 1 Hz. Storage modulus (E') and loss tangent factor (tan δ) were recorded as a function of temperature. The dimensions of the samples were (25×10×1) mm.

The storage modulus (E') and the tan δ values of the cured neat epoxy novolac composite and epoxy novolac composites containing 5, 10, 20, 30 wt % of Cardolite NC-514 and Cardolite NC-547 as a function of temperature are shown in FIGS. 4(a) and 4(b). A single glass transition temperature ($T_g$) with a clear rubbery plateau region is observed. The storage modulus decreased gradually with the addition of cardolite revealing the increased flexibility of the epoxy novolac composites. The storage modulus also dropped with increasing temperature and passed through $T_g$ region before reaching the rubbery plateau, where the segmental motions of the network chain occur cooperatively.

It can be clearly seen from the figure that, plots of loss tangent (tan δ) gave single peak which indicated that there was no phase separation in the cured epoxy novolac composition. With respect to temperature, tan δ changed slightly that corresponds to $T_g$. The decrease in $T_g$ with an increase in cardolite content indicated the flexible nature of novolac epoxy composites which are otherwise brittle in nature. The $T_g$ values obtained from DMTA are shown in Table 1.

E. Tensile Strength and Izod Impact Strength

Tensile strength and % elongation values were determined using an Instron Universal testing machine as per the standard ASTM D 638-V. A 10 kN load cell was used for measuring the load and a constant cross head speed of 5 mm min$^{-1}$ was maintained. At least five dog bone shaped specimens were prepared for each type of composite in mild steel mould and average value was considered.

The impact energies absorbed by the composites were measured on Ceast izod impactor. The specimens were prepared as per the standard ASTM D 256-02. At least five specimens were prepared for each composition and an average value was considered.

The incorporation of Cardolite NC-514 and Cardolite NC-547 flexibilizers in novolac epoxy resins affected the mechanical properties of the final cured epoxy novolac composites. The results are summarized in Table 3. It can be found that in the case of composites with Cardolite NC-514, the tensile and impact strength increased with increase in cardolite content from 5 to 30 wt %. However, there was hardly any change in the % elongation w. r. t. increase in cardolite content. While the tensile strength increased by 5-6%, more effect of flexibilizer was seen in impact strength which increased from 31.7 J/m to 68.6 J/m with Cardolite NC-514 content from 5 to 30 wt %. The increase in impact strength could be attributed to the presence of flexible chains in the backbone of the Cardolite NC-514, which can absorb an appreciable amount of energy under the impact. A moderate increase in the tensile strength of the composites with Cardolite NC-514 may be due to the rotational motion around the flexible —$CH_2$ groups and shear yielding which may result into strain hardening. On the contrary, in the case of novolac epoxy composites with Cardolite NC-547, the tensile strength decreased from 71.5 MPa (neat epoxy composite) to 63.6 MPa (with 30 wt % Cardolite NC-547).

TABLE 3

Mechanical properties of PPGEF/Cardolite NC-514 and NC-547 composites

| Sr. No. | Samples | Tensile strength (MPa) | Elongation (%) | Impact strength (J/m) |
|---|---|---|---|---|
| | | Neat PPGEF composite | | |
| 1. | Neat | 71.5 | 2.46 | 24.5 |
| | | PPGEF/Cardolite NC-514 | | |
| 2. | NC-514-10 | 72.4 | 2.93 | 33.3 |
| 3. | NC-514-20 | 74.3 | 3.02 | 42.4 |
| 4. | NC-514-30 | 76.2 | 2.72 | 68.6 |
| | | PPGEF/Cardolite NC-547 | | |
| 5. | NC-547-10 | 68.9 | 2.60 | 36.9 |
| 6. | NC-547-20 | 64.1 | 2.88 | 40.8 |
| 7. | NC-547-30 | 63.7 | 2.15 | 53.3 |

The decrease in tensile strength could be attributed to the hindered rotational motion in the chain as a result of the close proximity of rigid phenyl groups. Further, the increase in impact strength was less as compared to the composites containing Cardolite NC-514. This could be due to the less flexible nature of Cardolite NC-547.

F. Scanning Electron Microscopy (SEM)

The surface morphology analysis was performed on SEM Leica-440 scanning electron microscope at ambient temperature. The cryo fractured cured composite specimens were gold sputter coated prior to scanning.

The SEM images of the cryo fractured specimens for cured neat and cardolite incorporated epoxy novolac composites are shown in FIG. 5. The specimens were scanned at a magnification of 1K. The fractured surface of the neat composite [FIG. 5(a.1) or 5(b.1)] shows a very smooth and plain morphology, which indicate that the fracture is brittle. In all the scanned images, no phase separation was observed which clearly indicates the compatibility of PPGEF and Cardolite NC-514/Cardolite NC-547. This can also be confirmed from the single $T_g$ peaks obtained in DSC and DMA measurements. It can be seen from FIG. 5(a) (2-7), the fracture is ductile for the PPGEF/Cardolite NC-514 composites influenced by the incorporation of Cardolite NC-514. For PPGEF/Cardolite NC-547 composites [FIG. 5(b) (2-7)], the fractured surfaces indicate the homogeneity of PPGEF and Cardolite NC-547 upon curing.

ADVANTAGES OF THE PRESENT INVENTION

Effective toughening of brittle epoxy novolac resin (PPGEF) using cardanol based epoxy resins (Cardolite NC-514 and Cardolite NC-547) used as modifiers.

Bio-derived materials; may give better strength and toughening.

We claim:

1. A process for preparation of epoxy novolac composite consisting of steps:
   a. mixing poly [(phenylglycidyl ether)-co-formaldehyde] PPGEF with bio-derived-difunctional glycidyl ether epoxy resin or polyglycidyl ether of an alkenyl phenol formaldehyde novolac resin in amounts ranging from 5 to 30 wt % to obtain mixture; and
   b. adding 4,4'-Diamino-3,3'-dimethyldicyclohexyl methane BMCHA to the mixture of step (a) in amounts ranging from 1-1.5 equivalents to obtain the composite;
   wherein BMCHA is highly compatible with PPGEF and BMCHA cures at 120° C.; and
   wherein impact strength of said composite increases on increasing amount of bio-derived-difunctional glycidyl ether epoxy resin or polyglycidyl ether of an alkenyl phenol formaldehyde novolac resin from 5 wt % to 30 wt %.

2. An epoxy novolac composite consisting of:
   a) poly [(phenylglycidyl ether)-co-formaldehyde] PPGEF;
   b) 4, 4'-diamino-3, 3'-dimethyldicyclohexyl methane BMCHA;
   c) di-functional glycidyl ether epoxy resin;
   wherein (b) to (a) is in the range of 1 to 1.5 equivalents;
   wherein BMCHA is highly compatible with PPGEF; and
   wherein said composite exhibits increase in both tensile strength and impact strength on increasing amount of (c) from 10 wt % to 30 wt %; and tensile strength increasing from 72.4 to 76.2 MPa and impact strength increasing from 33.3 to 68.6 Jim with increasing amount of c) in said composite.

3. The composite as claimed in claim 2, wherein glass transition temperature (Tg) of said composite decreases from 110° C. to 90° C. on increasing amount of (c) from 5 wt % to 30 wt %.

4. The composite as claimed in claim 2, wherein said composite exhibit tensile strength of 76.2 MPa and impact strength of 68.6 Jim when c) is present in an amount of 30 wt %.

5. An epoxy novolac composite consisting of:
   a) poly [(phenylglycidyl ether)-co-formaldehyde] PPGEF;
   b) 4, 4'-diamino-3, 3'-dimethyldicyclohexyl methane BMCHA;
   c) polyglycidyl ether of an alkenyl phenol formaldehyde novolac resin;
   wherein (b) to (a) is in the range of 1 to 1.5 equivalents;
   wherein BMCHA is highly compatible with PPGEF; and wherein said composite exhibits increase in impact strength from 36.9 to 53.3 Jim on increasing amount of (c) from 10 wt % to 30 wt %.

6. The composite as claimed in claim 5, wherein said composite exhibit tensile strength of 63.7 MPa and impact strength of 53.3 J/m when c) is present in an amount of 30 wt %.

7. The composite as claimed in claim 5, wherein glass transition temperature (Tg) of said composite decreases from 116° C. to 100° C. on increasing amount of (c) from 5 wt % to 30 wt %.

* * * * *